US012311377B2

(12) United States Patent
Choi et al.

(10) Patent No.: US 12,311,377 B2
(45) Date of Patent: May 27, 2025

(54) HYDRAULIC BREAKER WITHOUT BACK HEAD

(71) Applicants: Eom Ji Choi, Gyeongsangbuk-do (KR); Seong Gyu Choi, Gyeongsangbuk-do (KR)

(72) Inventors: Eom Ji Choi, Gyeongsangbuk-do (KR); Seong Gyu Choi, Gyeongsangbuk-do (KR)

(73) Assignee: Eom Ji Choi, Gyeongsangbuk-do (KR)

( * ) Notice: Subject to any disclaimer, the term of this patent is extended or adjusted under 35 U.S.C. 154(b) by 0 days.

(21) Appl. No.: 18/573,427

(22) PCT Filed: Jun. 27, 2022

(86) PCT No.: PCT/KR2022/009091

§ 371 (c)(1),
(2) Date: Dec. 21, 2023

(87) PCT Pub. No.: WO2023/277470

PCT Pub. Date: Jan. 5, 2023

(65) Prior Publication Data

US 2024/0293824 A1 Sep. 5, 2024

(30) Foreign Application Priority Data

Jul. 2, 2021 (KR) ........................ 10-2021-0087005

(51) Int. Cl.
*B02C 1/00* (2006.01)
*E02D 7/10* (2006.01)
*E02F 3/96* (2006.01)

(52) U.S. Cl.
CPC ................ *B02C 1/005* (2013.01); *E02D 7/10* (2013.01); *E02F 3/966* (2013.01)

(58) Field of Classification Search
CPC ............. B02C 1/005; E02D 7/10; E02F 3/966
See application file for complete search history.

(56) References Cited

U.S. PATENT DOCUMENTS

2021/0087786 A1* 3/2021 Lee .......................... B25D 9/12

FOREIGN PATENT DOCUMENTS

| | | |
|---|---|---|
| JP | 60-005916 A | 1/1985 |
| JP | 61-047932 B2 | 10/1986 |
| JP | 01-036987 Y2 | 11/1989 |
| JP | 06-024422 Y2 | 6/1994 |
| KR | 10-0820644 B1 | 4/2008 |
| KR | 10-0931812 B1 | 12/2009 |

OTHER PUBLICATIONS

International Search Report for PCT/KR2022/009091 mailed Sep. 26, 2022 from Korean Intellectual Property Office.

* cited by examiner

*Primary Examiner* — Nathaniel C Chukwurah
(74) *Attorney, Agent, or Firm* — Revolution IP, PLLC

(57) ABSTRACT

A hydraulic breaker without a back head, includes a main control valve, to which fluid is supplied from the outside of the polyhedron, and accommodating a pilot valve for controlling the main control valve, in the interior space of the polyhedron, and in which impact force is obtained by double-acting cylinders, operated by the main control valve, moving modules that are connected to piston rods backwards and forwards, thus moving an integrated impact ram and ram block module forward, and filled compressed gas rapidly pulling back the integrated impact ram and ram block module.

4 Claims, 7 Drawing Sheets

HYDRAULIC BREAKER WITHOUT BACK HEAD

TECHNICAL FIELD

The present invention relates to a hydraulic breaker, and more specifically, to a hydraulic breaker without a back head and having a cylinder block with a polyhedral assembly structure.

BACKGROUND ART

Generally, a hydraulic breaker is attached to construction machinery such as excavators and used for crushing, compaction, and pile driving.

In FIGS. 1 and 2, a hydraulic breaker includes a front head 300 that has a quadrangular structure on the outside and a cylindrical structure on the inside to accommodate a chisel 200, a cylinder block 400 that accommodates an impact piston 600, two cylinders 700, a back head 500 filled with nitrogen gas, etc.

A driving method of a general hydraulic breaker is that a flow path is changed by a switch valve 800 when the impact piston 600 receives fluid from the outside and moves forward, and the impact piston 600 rapidly moves backward and obtains impact force due to a gas pressure charged in the back head 500.

The impact piston is formed of a lower portion, a middle portion, and an upper portion, and a stroke distance should be long to gain effective impact force. That is, the lower portion, the middle portion, and the upper portion should each be lengthened. For example, to increase the stroke distance by 200 mm, the lengths of the lower portion, the middle portion, and the upper portion should each be increased by 200 mm. Also, when an upper bush and a lower bush are included, a length of the impact piston is much greater, so the stroke distance cannot be easily increased.

In addition, as the stroke distance of the impact piston increases, lengths of the cylinder block and the back head also increase, increasing the size and weight of the overall structure. Therefore, there are many problems when operating construction machinery, such as increased fuel efficiency and product production costs, as well as inconvenience in handling.

Accordingly, Korean Patent No. 10-0820644 discloses "a back head structure of a hydraulic breaker" to increase a charging pressure by increasing the capacity of nitrogen gas charged inside by increasing the size of the back head.

Even in this breaker, the size of the overall structure eventually increases, causing the problems described above.

DISCLOSURE

Technical Problem

The present invention is directed to providing a hydraulic breaker without a back head and having a cylinder block with a polyhedral assembly structure that not only reduces the overall structure, but also an impact piston type is designed as an impact ram type without a piston part, thereby achieving a longer stroke distance and increased impact force, and the length of the impact ram is shortened, leading to cost reduction. Moreover, costs are reduced by using a seal in only one part of an impact ram cylinder.

In addition, the present invention replaces the role of the conventional back head by sealing an assembly surface of a plate assembled into a polyhedron and applying a seal retainer to a ram cylinder to fill a sealed space with compressed gas.

A block guide is installed to prevent each module containing a linear bearing block, a hinge block, a push rod and a valve pressing adjustment rod from breaking away when each module moves forward and backward. To guide the impact ram and a ram block module in a straight line, a plurality of linear bearing blocks and linear bearing guides are installed so that the impact ram and the ram block module reciprocate stably.

In addition, the present invention provides a hydraulic breaker without a back head and having a cylinder block made into a polyhedron that is able to be disassembled and assembled, making it easy to replace internal consumables, so that the best performance may be maintained even for long-term use by replacing consumables in a timely manner.

Technical Solution

One aspect of the present invention provides a hydraulic breaker without a back head including: a plate on which a plurality of tabs, bolt holes, gas inlets, and oil inlets are machined, and a pilot passage hole connecting a main control valve and a pilot valve is perforated therein; the main control valve that receives fluid from an outside of a polyhedron; the pilot valve that controls the main control valve in a sealed space inside the polyhedron; an impact ram integrally coupled with a ram block module; a ram cylinder in which the impact ram reciprocates; each double-acting cylinder operated by the main control valve; each module integrally coupled with a piston rod within each double-acting cylinder; a block guide that prevents each module from breaking away when moving forward and backward; the impact ram and the ram block module that are moved forward by each module; a linear bearing guide that guides each module and the impact ram and the ram block module in a straight line; and a charged compressed gas that moves the impact ram and the ram block module, which are moved forward, backward to have an impact.

A block guide is further included to prevent each module from being separated.

An assembly surface of a plate assembled into a polyhedral is sealed, and a seal retainer is applied to the ram cylinder to fill a sealed space with the compressed gas.

Each module includes a linear bearing block, a hinge block, a push rod, and a valve pressing adjustment rod.

Each double-acting cylinder includes a module coupled to the piston rod.

The hinge block includes a locking portion that comes into contact with a protruding portion of the ram block module.

Two spools in the pilot valve are alternately operated by a seesaw plate whenever two valve pressing adjustment rods press the spools protruding from the left and right based on a seesaw plate axis.

A limit roller is further included to separate the hinge block from the ram block module.

Advantageous Effects

The hydraulic breaker without the back head according to the present invention not only reduces manufacturing costs by manufacturing the cylinder block in a polyhedral shape, which reduces the overall structure, but also allows for easy disassembly and assembly, so the best hydraulic breaker performance can always be maintained by replacing consumables in a timely manner.

By applying a seal retainer to a ram cylinder, which has an assembly structure of a polyhedron, a sealed space is filled with compressed gas to fulfill the function of the excluded back head.

In addition, by changing a structure of an impact piston to an impact ram type without a piston part, a stroke distance is increased and the impact force of a hydraulic breaker is improved, which improves work efficiency and reduces fuel efficiency. Also, by applying a linear bearing block and a linear bearing guide, the length of the impact ram can be significantly reduced, and a seal retainer can be used in only one place on a ram cylinder, reducing manufacturing and management costs.

MODES OF THE INVENTION

Figure 1:
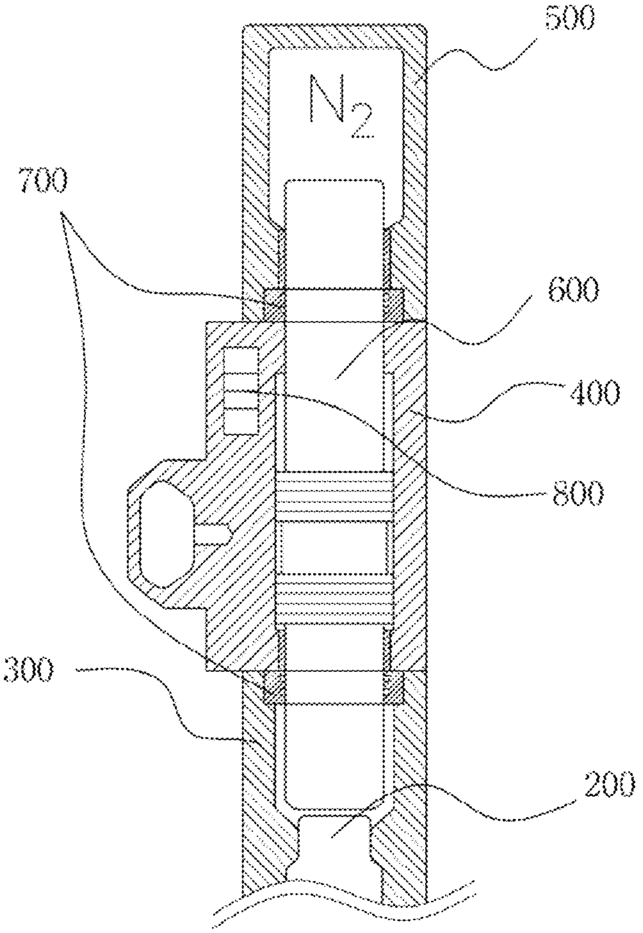
FIG. 1 Prior Art
FIG. 1 is a partial diagram of the conventional hydraulic breaker.
Figure 2:
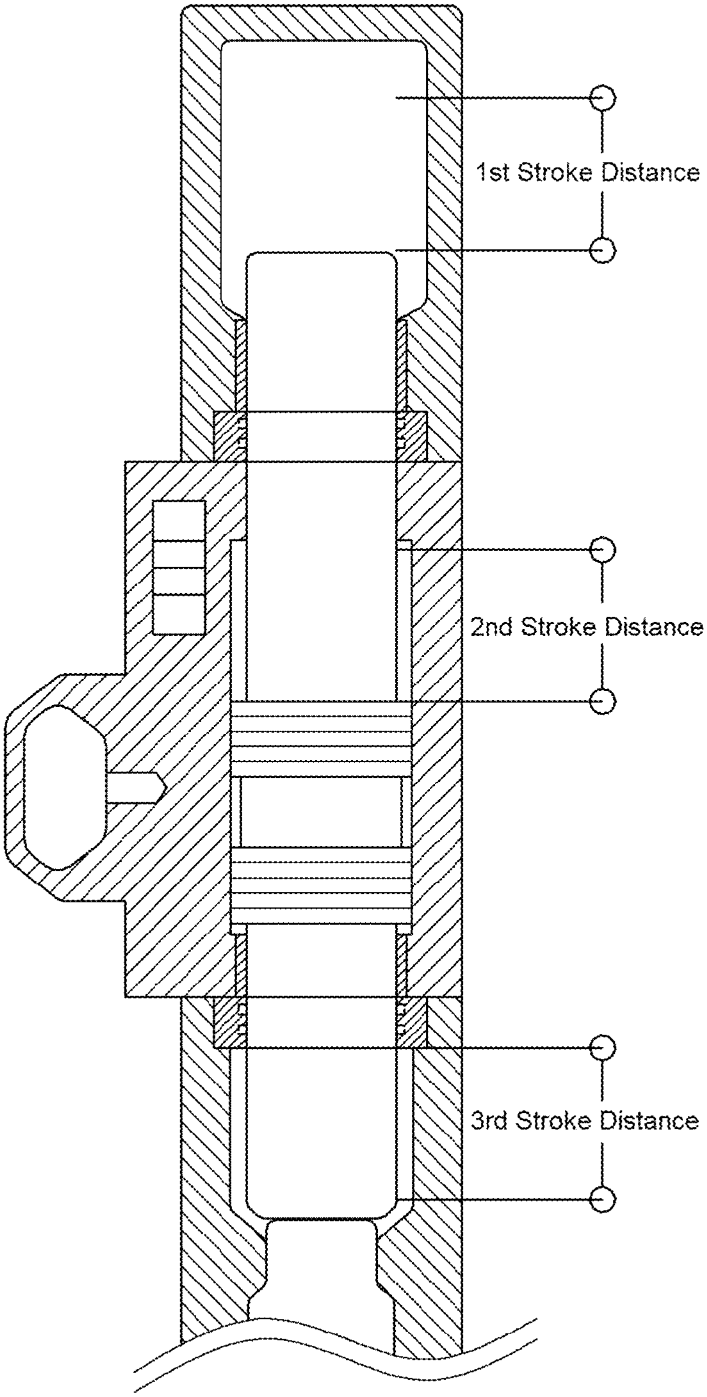
FIG. 2 Prior Art
FIG. 2 is a diagram showing a stroke section of the conventional piston.

Hereinafter, a preferred embodiment of a hydraulic breaker without a back head according to the present invention will be described in detail with reference to the attached drawings. For reference, in describing the present invention below, terms referring to the components of the present invention are named in consideration of the function of each component, and should not be understood as limiting the technical components of the present invention.

Referring to FIGS. 1 to 9, a hydraulic breaker without a back head according to the present invention is attached to construction machinery such as an excavator and is used for crushing, compaction, and pile driving and includes an impact ram, a ram cylinder, a ram block module, a double-acting cylinder, a module, a main control valve, a pilot valve, a seal retainer, plates, fastening tabs, a linear bearing block, a linear bearing guide and a block guide.

The hydraulic breaker without the back head includes a plate 100 on which a plurality of fastening tabs 7, bolt holes (not shown), gas inlets, oil inlets, oil outlets (not shown), etc. are processed and an assembly surface of the plate 100 assembled into a polyhedron is sealed and a seal retainer 80 is applied to a ram cylinder 50 to make a sealed space and fill the sealed space with gas.

The filled gas pressure functions to obtain impact force by rapidly moving the advanced impact ram 40 and ram block module 60 backward.

In addition, a plurality of pilot flow holes 6 connecting a main control valve 70 and a pilot valve 71 are perforated in the plate 100 assembled into the polyhedron.

The main control valve 70 receives fluid from the outside and supplies the fluid to the inside of the plate 100 through the pilot flow holes 6, and the interior space of the plate 100 accommodates the pilot valve 71, which controls the main control valve 70 and double-acting cylinders 20 and 21.

Figure 3:
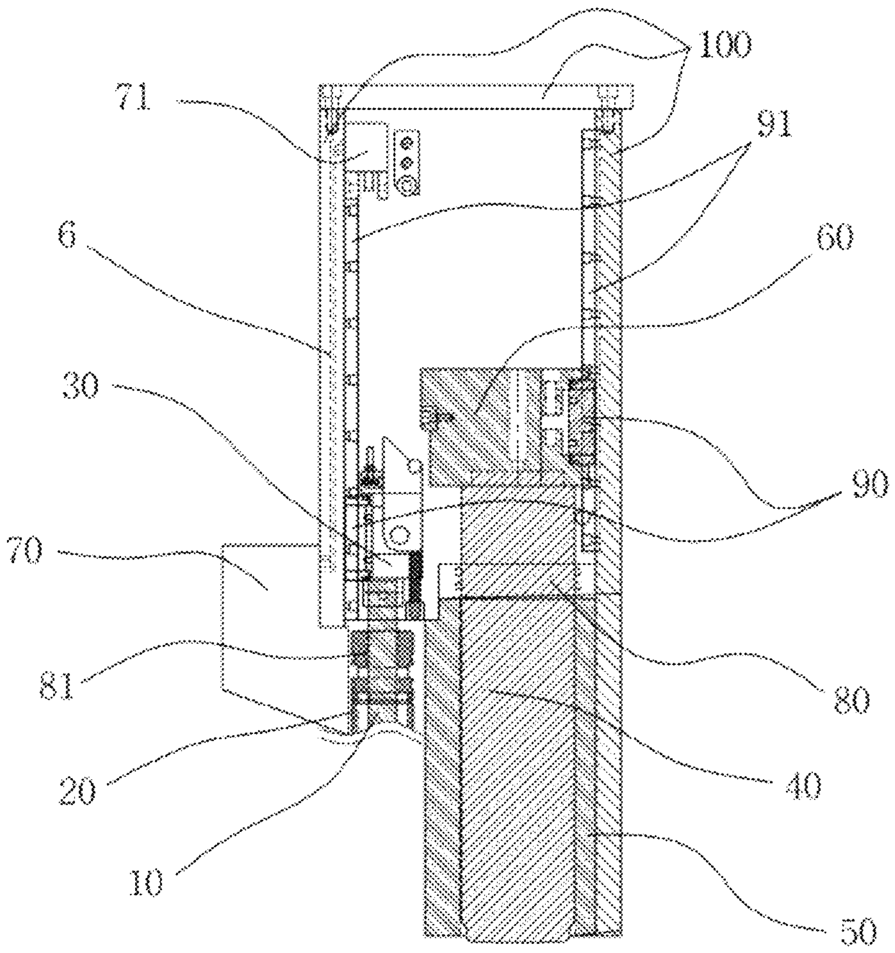
FIG. 3 is a side structural diagram of a hydraulic breaker without a back head according to the present invention.
Figure 4:
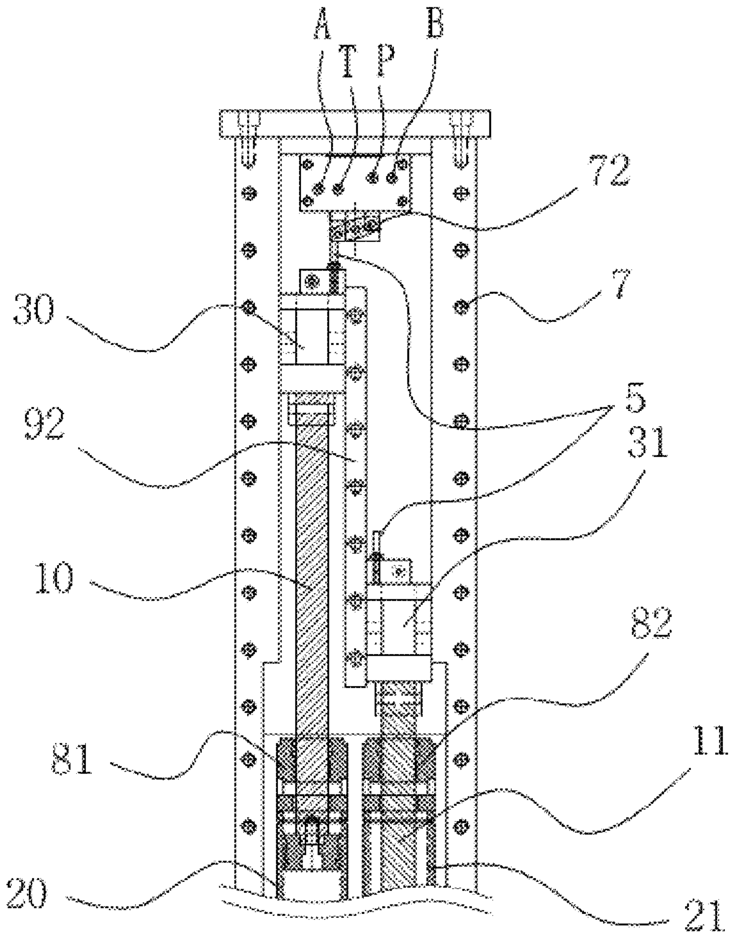
FIG. 4 is a plan view of a hydraulic breaker without a back head according to the present invention.

Referring to FIGS. 3 and 4, by first and second piston rods 10 and 11 that receive fluid from the main control valve 70 and operate alternately forward and backward and are integrated with first and second modules 30 and 31, the impact ram 40 and the ram block module 60, which are integrated, move forward, and the impact ram 40 and the ram block module 60 also rapidly move backward due to gas pressure.

That is, when the integrated first piston rod 10 and first module 30 move forward, the impact ram 40 and the ram block module 60 move forward together. If the advanced impact ram 40 and the ram block module 60 move backward, the integrated second piston rod 11 and second module 31, which are on standby, move forward and move the integrated impact ram 40 and the ram block module 60 forward.

Figure 5:
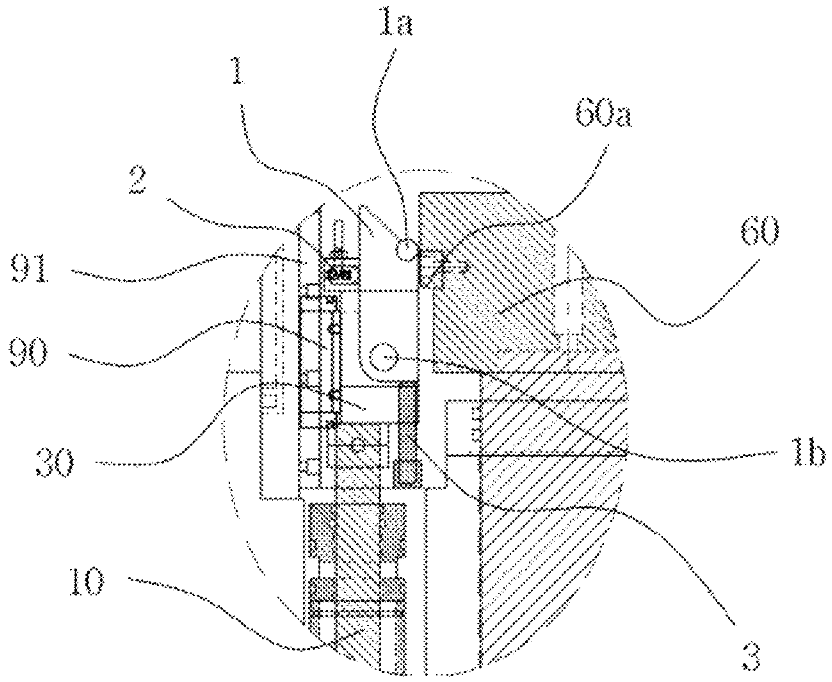
FIG. 5 is a side structural diagram illustrating a state when a first piston according to the present invention finishes moving backward.
Figure 6:
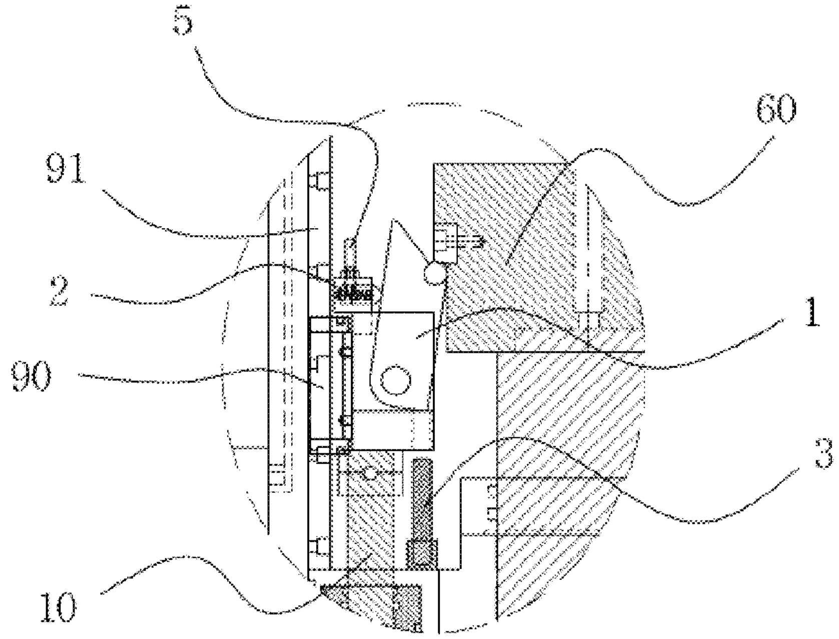
FIG. 6 is a side structural diagram illustrating a state when a first piston according to the present invention moves forward.

To explain in more detail, referring to FIGS. 5 and 6, the first module and second module 30 and 31 include a hinge block 1, a push rod 2, a valve pressing adjustment rod 5 (the second module 31 also has the same configuration as the first module 30), and are integrated with a linear bearing block 90 and move by a linear bearing guide 91 and a block guide 92 when moving forward and backward.

By the main control valve 70, the first module 30 moves forward together with the first piston rod 10, and the second module 31 moves backward together with the second piston rod 11. When moving backward, the hinge block 1 in the second module 31 is in close contact with a limit rod 3 and stands upright, and the interference with the impact ram 40 and the ram block module 60 is eliminated.

Figure 7:
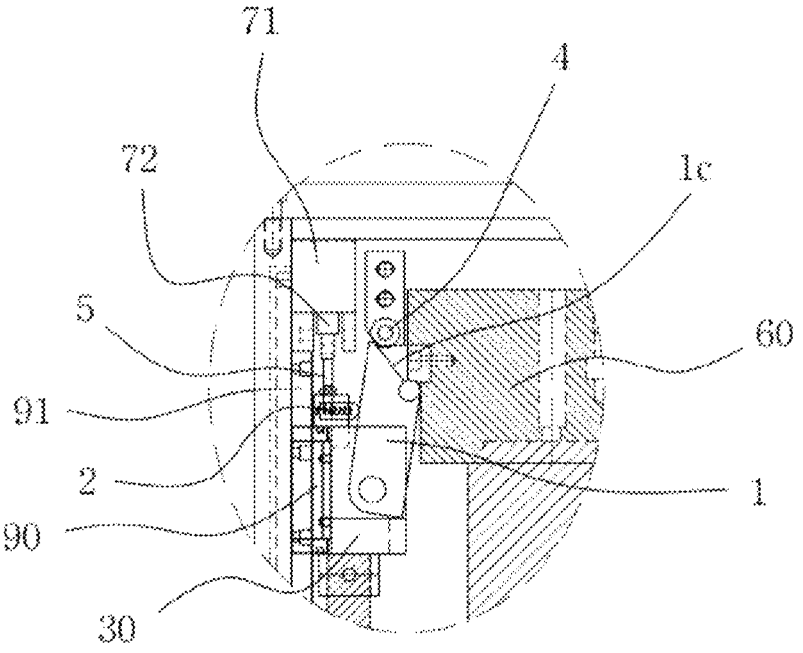
FIG. 7 is a side structural diagram illustrating a state before a first piston according to the present invention finishes moving forward.
Figure 8:
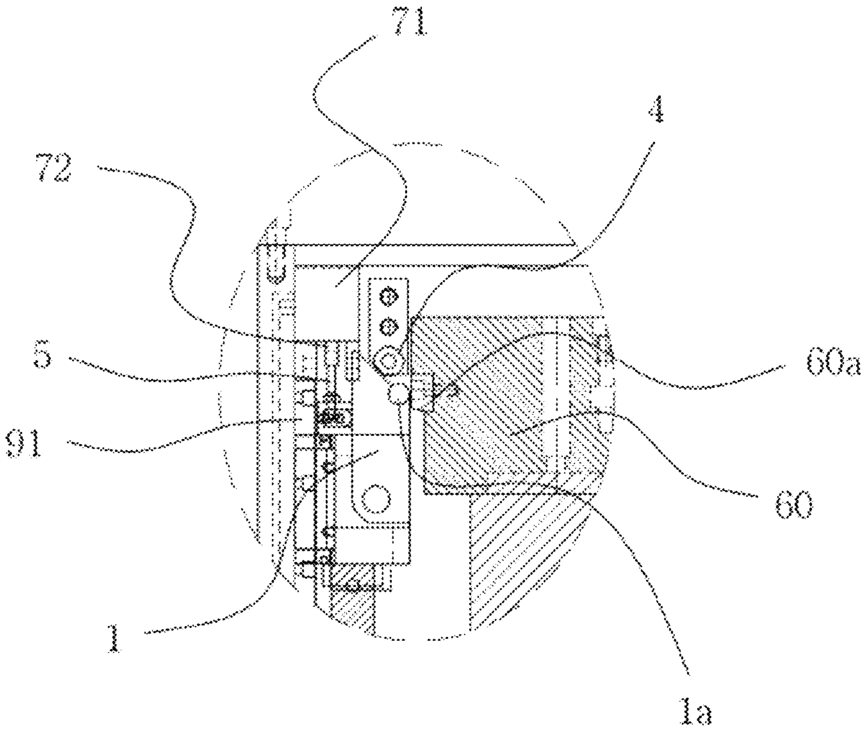
FIG. 8 is a side structural diagram illustrating a state when a first piston according to the present invention finishes moving forward.
Figure 9:
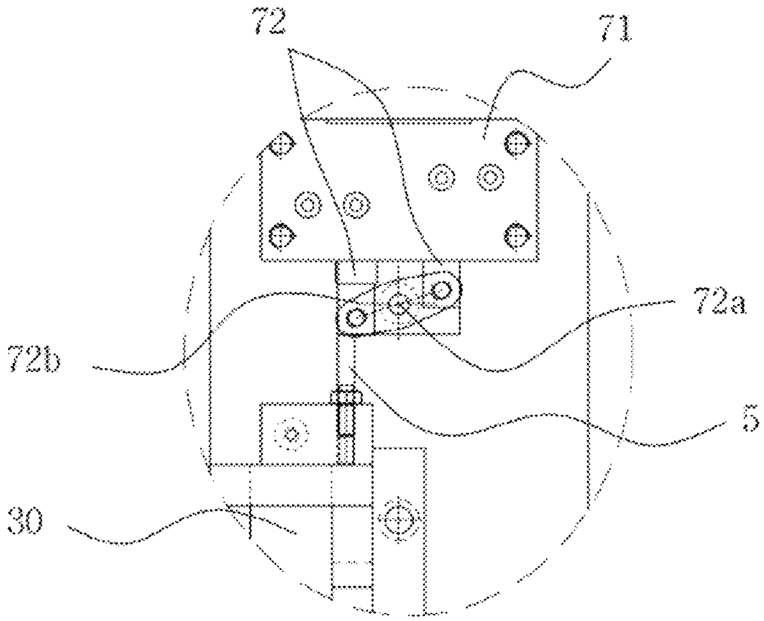
FIG. 9 is a detailed drawing showing an operating method of a spool according to the present invention.

In FIG. 6, when the second piston rod 11 moves forward, the push rod 2 in the second module 31 presses the hinge block 1, so that a locking portion 1*a* of the hinge block 1 comes into close contact with a protruding portion 60*a* of the ram block module 60 and thus moves forward with the impact ram 40. In FIGS. 7 to 9, when the advancing hinge block 1 comes into close contact with a limit roller 4, the hinge block 1 stands upright by the limit roller 4 along an inclined surface 1*c* formed on the hinge block 1 due to the forward movement and also is separated from the protruding portion 60*a* of the ram block module 60. The impact ram 40 and the ram block module 60, which are integrated, move rapidly backward due to the filled gas pressure to obtain an impact force. When the valve pressing adjustment rod 5 in the continuously advancing second module 31 presses a protruding spool 72 in the pilot valve 71, A and B flow paths in the pilot valve 71 are switched. In addition, the flow path (not shown) of the main control valve 70 is also switched, so that the integrated second piston rod 11 and the second module 31 move backward and the integrated first piston rod 10 and the first module 30, which are on standby, simultaneously move forward. As the first piston rod 10 and the first module 30 move forward, the integrated impact ram 40 and ram block module 60, moved backward by the compressed gas, move forward together in the same way as the second piston rod 11 and the second module 31 did. This sequence repeats automatically by executing the same operation.

Each hinge block 1 stands upright in close contact with each limit rod 3 (one of them is not shown).

In addition, the two spools 72 in the pilot valve 71 are based on a seesaw principle and are alternately operated by a seesaw plate 72*b* whenever the two valve pressing adjustment rods 5 press the spools from the left and right based on a seesaw plate axis 72*a*.

As described above, the technical ideas described in the embodiments of the present invention can be implemented independently or in combination with each other. In addition, the present invention is described through embodiments described in the drawings and detailed description of the invention, but these are merely illustrative, and various modifications and other equivalent embodiments can be made by those skilled in the art. Therefore, the technical protection scope of the present invention should be determined by the attached patent claims.

INDUSTRIAL APPLICABILITY

The present invention relates to a hydraulic breaker and more specifically, a hydraulic breaker without a back head and having a cylinder block with a polyhedral assembly structure.

The hydraulic breaker without the back head according to the present invention not only reduces manufacturing costs by manufacturing the cylinder block in a polyhedral shape, which reduces the overall structure, but also allows for easy disassembly and assembly, so the best hydraulic breaker performance can always be maintained by replacing consumables in a timely manner.

By applying a seal retainer to a ram cylinder, which has an assembly structure of a polyhedron, a sealed space is filled with compressed gas to fulfill the function of the excluded back head.

In addition, by changing a structure of an impact piston to an impact ram type without a piston part, a stroke distance is increased and the impact force of a hydraulic breaker is improved, which improves work efficiency and reduces fuel efficiency. Also, by applying a linear bearing block and a linear bearing guide, the length of the impact ram can be significantly reduced, and a seal retainer can be used in only one place on a ram cylinder, reducing manufacturing and management costs.

The invention claimed is:

1. A hydraulic breaker without a back head, comprising:

a plate on which a plurality of tabs, bolt holes, gas inlets, and oil inlets are machined, and a pilot passage hole connecting a main control valve and a pilot valve is perforated therein;

the main control valve that receives fluid from an outside of a polyhedron;

the pilot valve that controls the main control valve in a sealed space inside the polyhedron;

an impact ram integrally coupled with a ram block module;

a ram cylinder in which the impact ram reciprocates;

each double-acting cylinder operated by the main control valve;

each module integrally coupled with a piston rod within each double-acting cylinder;

a block guide that prevents each module from breaking away when each module moves forward and backward;

the impact ram and the ram block module that are moved forward by each module;

a linear bearing guide that guides each module and the impact ram and the ram block module in a straight line; and a charged compressed gas that moves the impact ram and the ram block module, which are moved forward, backward to obtain an impact.

2. The hydraulic breaker of claim 1, wherein a plate assembly part of the polyhedron is sealed, and a seal retainer is applied to the ram cylinder to fill the sealed space with the compressed gas.

3. The hydraulic breaker of claim 1, wherein each of the modules includes a linear bearing block, a hinge block, a push rod, and a valve pressing adjustment rod.

4. The hydraulic breaker of claim 1, the pilot valve is repeatedly alternately operated by a seesaw plate whenever two spools in the pilot valve press a protruding spool based on a seesaw plate axis.

* * * * *